(No Model.)

J. G. HALLAS.
HOSE CONNECTION.

No. 440,844. Patented Nov. 18, 1890.

WITNESSES
C. M. Newman,
Arley J. Munson.

INVENTOR
James G. Hallas
By J. H. M. Wooster
Atty.

UNITED STATES PATENT OFFICE.

JAMES G. HALLAS, OF WATERBURY, CONNECTICUT.

HOSE-CONNECTION.

SPECIFICATION forming part of Letters Patent No. 440,844, dated November 18, 1890.

Application filed September 26, 1889. Serial No. 325,205. (No model.)

*To all whom it may concern:*

Be it known that I, JAMES G. HALLAS, a citizen of the United States, residing at Waterbury, in the county of New Haven and State of Connecticut, have invented certain new and useful Improvements in Hose-Connections; and I do hereby declare the following to be a full, clear, and exact description of the invention, such as will enable others skilled in the art to which it appertains to make and use the same.

My invention has for its object to produce a hose-coupling which shall be simple and inexpensive to produce, durable, absolutely water-tight, and which may be applied by any person without other tools than an angular key.

With these ends in view I have devised the novel construction of which the following description, in connection with the accompanying drawings, is a specification, numbers being used to denote the several parts.

Figure 1:
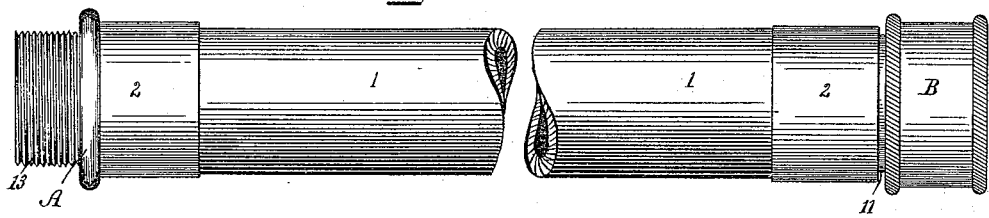
Figure 2:
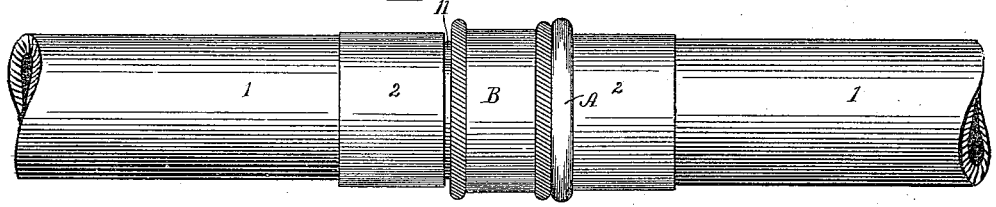
Figure 3:
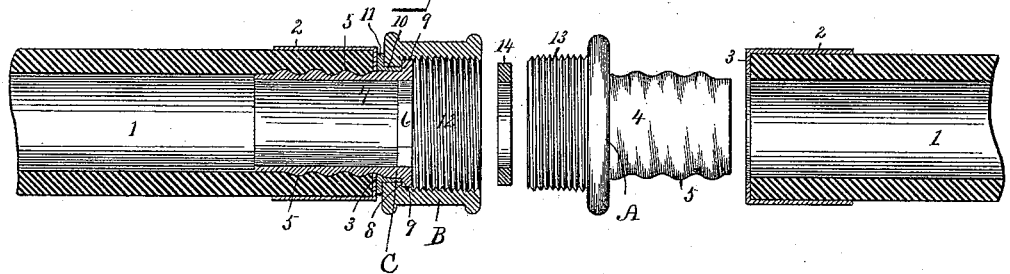
Figure 4:
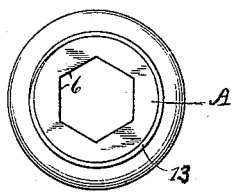
Figure 5:
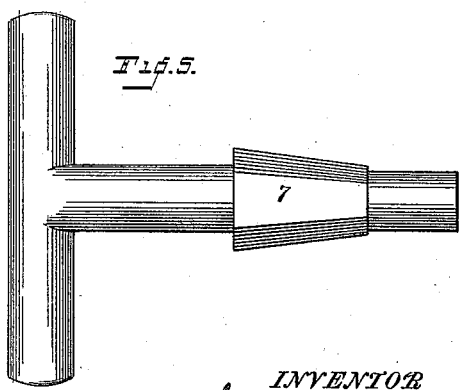

Figure 1 is an elevation illustrating the spigot and nozzle ends of a length of hose; Fig. 2, an elevation showing two lengths of hose coupled together; Fig. 3, a view, partially in elevation and partially in section, of the parts shown in Fig. 2 detached; Fig. 4, an end view of the connecting-sleeve detached, showing the opening in the internal sleeve to receive a key; and, Fig. 5 an elevation of a key adapted to engage the internal sleeve.

1 denotes the hose, and 2 a flexible sheet-metal sleeve adapted to slip over the outer end thereof, said sleeve being provided with an inwardly-turned flange 3, which rests against the end of the hose, as clearly shown at the right and left in Fig. 3.

The coupling consists, essentially, of three pieces—to wit, a part A adapted to be connected to a hose and provided with a male thread adapted to engage a female thread upon a nozzle or the sleeve of a coupling; a part B, which is a sleeve having a female thread adapted to engage the male thread upon a spigot or to be engaged by the thread upon part A of the coupling, and having at one end an inwardly-extending shoulder, and a part C, adapted to engage the hose, and having a shoulder adapted to engage the shoulder upon part B to connect the latter to the hose. The connection of parts A and C to the hose is effected by means of internal sleeves 4, having formed on the outer sides thereof rounded external screw-threads 5, a portion of the central opening through each of said parts being made more or less angular, as at 6, to adapt it for engagement by a key 7.

8 denotes an inwardly-extending shoulder or flange on part B, (the sleeve,) and 9 an outwardly-extending shoulder or flange on part C, which engages the inner side of shoulder 8. In practice I ordinarily place a collar 10, having a flange 11, between parts B and C in assembling. This is in order to insure that the sleeve shall turn freely. The collar surrounds part C, the end thereof resting against shoulder 9, and flange 11 of the collar resting between flange 3 of sleeve 2 and the outer side of shoulder 8 on part B, as is clearly shown in Fig. 3.

12 denotes a female thread within part C, (the sleeve,) and 13 a male thread on part A, adapted to engage therewith in the usual manner. 14 denotes a packing-ring, which I usually place within part B between the end of part A and the flange of part C. This is simply to insure that the connection shall be water-tight and to keep the water out of the threads of the coupling.

The parts are assembled as follows: Sleeves 2 are placed over the ends of the hose, the ends being, of course, cut square. Part C is passed through part B, the shoulders engaging, as clearly shown in Fig. 3, and the flanged collar preferably placed between said parts, as already described, and as shown in Fig. 3. The angular opening 6 of part C is then engaged by the key, and said part is turned into the end of the hose until flange 11 of the collar is pressed firmly against flange 3 of sleeve 2, the flexible sleeve yielding to conform to inequalities in the hose. It should be noted that threads 5 upon parts A and C are made coarse and are rounded so that they will not cut the hose. It is of course well understood that ordinary hose for sprinkling purposes consists of a tube of textile material coated internally and externally with rubber. In practice, however, it will almost invariably be found that one side of the hose is thicker than the other, making it impossible to secure a water-tight connection with a round rigid tube on the inside of the hose and a round rigid sleeve on the outer side. I overcome this objection wholly by making the outer sleeve of sheet metal and sufficiently flexible so that it will yield to conform to differences in thickness in opposite sides of the hose, and thereby secure a perfectly watertight connection at all times without the slightest injury to the hose. It will, furthermore, be apparent that if either the internal or external coating becomes broken the hose will quickly be ruined. By providing parts A and C with rounded threads, substantially as shown, I find in practice that said parts may be turned into ends of hose and that the threads will displace the internal rubber coating without, however, breaking it in the slightest, the hose being held against splitting by sleeve 2.

In practice the couplings may be removed and replaced an almost unlimited number of times without injuring the hose in the slightest, the pressure of the hose, more especially the inner coating thereof, upon the threads of the internal sleeves, moreover, being amply sufficient to insure a perfectly-tight joint. It will be apparent that parts A, B, and C together form a perfect coupling or union for two lengths of hose. Parts B and C together form a coupling whereby a length of hose may be attached to a spigot, and part A alone is adapted to receive a nozzle.

Having thus described my invention, I claim—

1. A hose-coupling consisting of a flexible sheet-metal sleeve adapted to inclose the end of the hose, an internally-threaded part or sleeve B, having an inwardly-projecting shoulder or flange, and a part C, having an internal angular or irregular portion for the engagement of a wrench or key, an outwardly-projecting shoulder or flange to engage the shoulder or flange of the sleeve B, and an integral extension having exterior rounded threads to engage the hose, combined with a flanged ring 10 between the said sleeve B and the flexible sleeve, and on which the said sleeve B is swiveled.

2. In combination, a hose, a flanged sleeve adapted to engage the outer end thereof, a part B, having an outwardly-extending shoulder, a rounded thread adapted to engage the interior of the hose, and an angular portion 6 to receive a key, a part C, having an internal shoulder adapted to engage the shoulder on part B, and a collar between parts B and C, which is provided with a flange lying between the shoulder on part B and the flange on the sleeve.

In testimony whereof I affix my signature in presence of two witnesses.

JAMES G. HALLAS.

Witnesses:
JAMES N. WEBB,
ROSWELL H. BUCK.